(12) United States Patent
Woo et al.

(10) Patent No.: US 8,816,838 B2
(45) Date of Patent: Aug. 26, 2014

(54) TRANSMISSION POSITION INDICATOR FOR VEHICLE

(75) Inventors: Jung Hoon Woo, Hwaseong-si (KR); Jun Ho Cha, Hwaseong-si (KR); Yang Gi Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 332 days.

(21) Appl. No.: 13/164,579

(22) Filed: Jun. 20, 2011

(65) Prior Publication Data

US 2012/0126968 A1    May 24, 2012

(30) Foreign Application Priority Data

Nov. 18, 2010    (KR) .......................... 10-2010-0114932

(51) Int. Cl.
  *B60Q 1/00*    (2006.01)
  *G05G 1/00*    (2008.04)
  *H01J 5/16*    (2006.01)

(52) U.S. Cl.
  USPC .............. 340/456; 340/461; 74/491; 313/112

(58) Field of Classification Search
  USPC ............................... 340/456; 74/491; 313/112
  See application file for complete search history.

(56) References Cited

U.S. PATENT DOCUMENTS

| | | | | |
|---|---|---|---|---|
| 5,245,313 A | * | 9/1993 | Polityka | 340/456 |
| 2007/0152554 A1 | * | 7/2007 | Kim et al. | 313/112 |
| 2008/0284942 A1 | * | 11/2008 | Mahama et al. | 349/64 |
| 2010/0149788 A1 | * | 6/2010 | Kim et al. | 362/97.2 |

FOREIGN PATENT DOCUMENTS

| | | |
|---|---|---|
| JP | 4-206798 | 8/1992 |
| JP | 5-22150 U | 3/1993 |
| JP | 5-35449 U | 5/1993 |
| JP | 11-34687 A | 2/1999 |
| JP | 11-260139 A | 9/1999 |
| KR | 10-2004-0031251 A | 4/2004 |
| KR | 10-0943233 B1 | 2/2010 |

* cited by examiner

*Primary Examiner* — Jack K Wang
(74) *Attorney, Agent, or Firm* — Morgan, Lewis & Bockius LLP (57) ABSTRACT

A transmission position indicator for a vehicle may include a housing, a PCB (printed circuit board) embedded in the housing, wherein a light source may be provided at a predetermined position on the PCB, a light guide plate provided above the PCB and receiving light from the light source, wherein the light guide plate includes light-diffusion-ink patterns printed on a surface thereof, each of the light-diffusion-ink patterns having ink dots, and a cover coupled to an upper end of the housing, wherein the cover may be made of opaque material and includes gear indication characters therein, the gear indication characters being made of transparent material, so that the light transmitted from the light guide plate may be emitted outside the cover through the gear indication characters.

10 Claims, 6 Drawing Sheets

FIG. 10

TRANSMISSION POSITION INDICATOR FOR VEHICLE

CROSS-REFERENCE TO RELATED APPLICATIONS

The present application claims priority to Korean Patent Application No. 10-2010-0114932 filed on Nov. 18, 2010, the entire contents of which is incorporated herein for all purposes by this reference.

BACKGROUND OF THE INVENTION

1. Field of the Invention

The present invention relates to a transmission position indicator which is provided around a gear shift lever in the passenger compartment of a vehicle to indicate a current position of a transmission of the vehicle.

2. Description of Related Art

Generally, a transmission position indicator is provided on the cluster gauge and upper cover of the console in the passenger compartment of a vehicle. The transmission position indicator indicates the current position of the transmission of the vehicle. Drivers can easily discern the current position of the transmission using the transmission position indicators. Typically, the positions of an automatic transmission are designated by characters, such as P (parking), R (reverse), N (neutral), D (drive), + (higher gear) and − (lower gear). These gear indication characters are marked on the transmission position indicator. The transmission position indicator is configured such that the characters emit light.

In the daytime, even though the gear indication characters do not emit light, a driver can easily discern the position of the transmission using the position of a gear shift lever, so long as the gear shift lever is aligned with the desired gear indication character. Particularly, at night, the gear indication characters P, R, N, D, + and − emit light to enable the driver to discern the position of the transmission. Furthermore, for the sake of convenience of the driver, selected-gear indication marks which emit light may be provided to more clearly indicate the current position of the transmission.

Therefore, to emit light from the gear indication characters and the selected-gear indication marks, vehicle manufacturers must install light emitting units at positions adjacent to the respective gear indication characters and provide separate light emitting units around the respective selected-gear indication marks of the gear indication characters. Here, the selected-gear indication marks may be integrally provided with the transmission position indicator or, alternatively, they may be separately provided from the transmission position indicator. The following conventional technique shows the case where selected-gear indication marks are integrally provided with a transmission position indicator in such a way that the selected-gear indication marks are integrated with gear indication characters.

Figure 1:
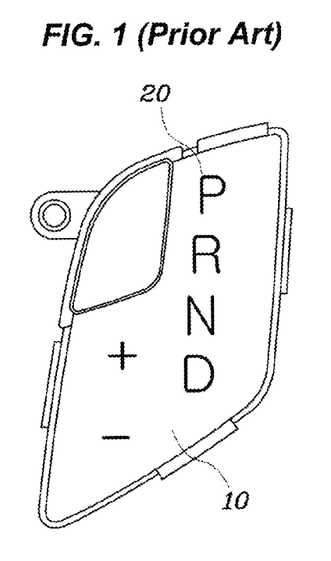
FIG. 1 is a perspective view showing a conventional transmission position indicator for a vehicle.
Figure 2:
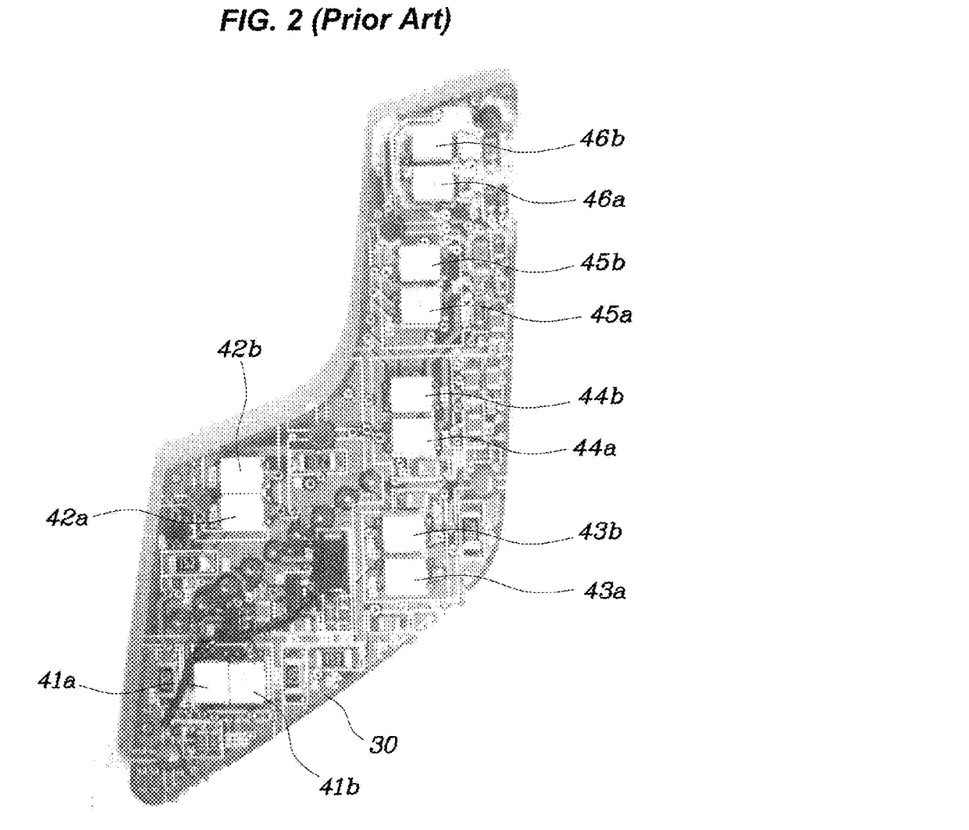
FIG. 2 is a photograph showing a PCB of the transmission position indicator of FIG. 1.

FIG. 1 is a perspective view showing the conventional transmission position indicator for vehicles. FIG. 2 is a photograph showing a PCB of the transmission position indicator of FIG. 1.

As shown in FIGS. 1 and 2, the conventional transmission position indicator includes a cover 10 and gear indication characters 20 (P,R,N,D, + and −) which are provided on the cover 10. The gear indication characters 20 emit light not only at night but also in the daytime. Furthermore, a gear indication character selected by the driver emits different color of light to distinguish the selected gear from other gears. For this, as shown in FIG. 2, two light emitting units 41a, 41b, 42a, 42b, 43a, 43b, 44a, 44b, 45a, 45b, 46a, 46b are provided on a PCB 30 around each gear indication character 20. The reason for this is that the basic six light emitting units for emitting light corresponding to the six gear indication characters 20 are required, and six separate light emitting units which emit different colors of light are required on the respective gear indication characters 20 to indicate the selected gear.

As such, in the conventional transmission position indicator, because at least two light emitting units are required on each gear indication character, a total of twelve light emitting units are required. Thereby, the production cost is increased. Furthermore, the size of the PCB is increased, thus resulting in the problem of restricting the total design of the indicator. Particularly, there is a recent trend to minimize the size of the transmission position indicator and use the remaining space as space for a cup holder or a separate reception space. To ensure the visibility of the position of the transmission even though the size of the transmission position indicator has been minimized, light emitting units for different colors of light are further required on each shift gear. However, a method of reducing the number of light emitting units and simplifying the PCB is required to enhance the freedom of the design.

It is to be understood that the foregoing description is provided to merely aid the understanding of the present invention, and does not mean that the present invention falls under the purview of the related art which was already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a transmission position indicator which can reduce the number of light emitting units provided on a PCB, thus reducing the production cost, and reducing the size of the PCB, thereby overcoming the design restriction.

In a aspect of the present invention, the transmission position indicator for a vehicle, may include a housing, a PCB (printed circuit board) embedded in the housing, wherein a light source may be provided at a predetermined position on the PCB, a light guide plate provided above the PCB and receiving light from the light source, wherein the light guide plate may include light-diffusion-ink patterns printed on a surface thereof, each of the light-diffusion-ink patterns having ink dots, and a cover coupled to an upper end of the housing, wherein the cover may be made of opaque material and may include gear indication characters therein, the gear indication characters being made of transparent material, so that the light transmitted from the light guide plate may be emitted outside the cover through the gear indication characters.

The light source may emit the light onto a first end of the light guide plate in a longitudinal direction of the light guide plate.

A light diffusion sheet may be coupled to a lower surface of the light guide plate.

The light diffusion sheet may be spaced from the lower surface of the light guide plate with a predetermined gap.

The light-diffusion-ink patterns may be printed on the lower surface of the light guide plate, and the light diffusion sheet may be coupled to the light guide plate below the light-diffusion-ink patterns.

Each of the ink dots of the light-diffusion-ink patterns may have a polygonal shape.

The light-diffusion-ink patterns may be printed on the light guide plate at positions spaced apart from each other by predetermined distances corresponding to the respective gear indication characters.

The light-diffusion-ink patterns may have shapes corresponding to the respective gear indication characters.

The light-diffusion-ink patterns may be classified into a plurality of sections according to a distance that the patterns may be spaced apart from the light source, wherein the sections may be arranged such that as the distance that the patterns may be spaced apart from the light source increases, brightness of the ink dots may be increased.

The light-diffusion-ink patterns may be classified into a plurality of sections according to a distance that the patterns may be spaced apart from the light source, wherein the sections may be arranged such that as the distance that the patterns may be spaced apart from the light source increases, a distance between the ink dots may be reduced.

Each of the ink dots in the section disposed adjacent to the light source may have a hexagonal shape Each of the ink dots in the section disposed away from the light source may have a pentagonal shape.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, a transmission position indicator for a vehicle according to the present invention will be described in detail with reference to the attached drawings.

Figure 3:
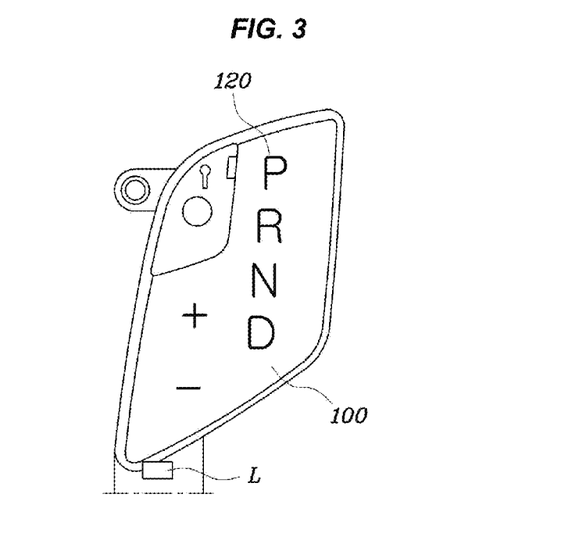
FIG. 3 is a perspective view showing a transmission position indicator for a vehicle, according to an exemplary embodiment of the present invention.
Figure 4:
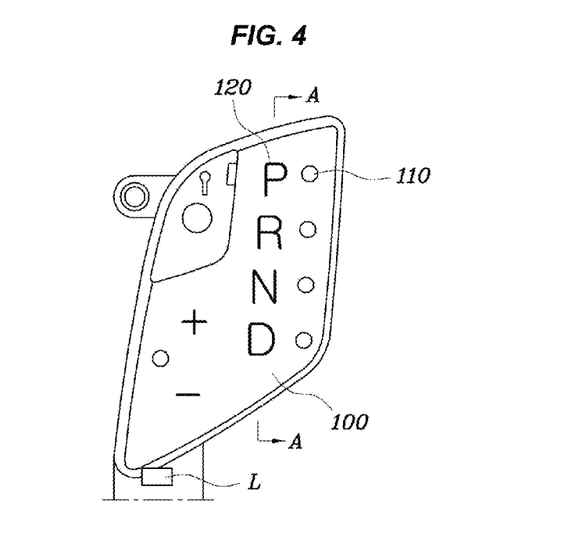
FIG. 4 is a perspective view showing a transmission position indicator for a vehicle, according to another embodiment of the present invention.
Figure 5:
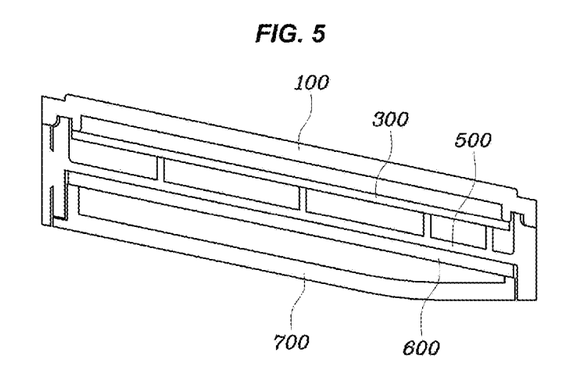
FIG. 5 is a sectional view taken along line A-A of FIG. 4.

FIGS. 3 and 4 are perspective views showing embodiments of the transmission position indicator according to an exemplary embodiment of the present invention. FIG. 5 is a sectional view taken along line A-A of FIG. 4.

The transmission position indicator according to an exemplary embodiment of the present invention includes a housing 500, a PCB (printed circuit board) 600, a light guide plate 300 and a cover 100. The housing 500 is provided around a gear shift lever of the vehicle. The PCB 600 is embedded in the housing 500. A light source L is installed at a predetermined position on the PCB 600. The light guide plate 300 is installed above the PCB 600, and light is transmitted from the light source L to the light guide plate 300. Dotted light-diffusion-ink patterns 310 are printed on one surface of the light guide plate 300. The cover 100 is coupled to an upper end of the housing 500 and is made of opaque material. Gear indication characters 120 which are transparent are formed in the cover 100, so that light transmitted from the light guide plate 300 is emitted outside the cover 100 through the gear indication characters 120.

The housing 500 is installed around the gear shift lever which is provided in the passenger compartment of the vehicle. The housing 500 is open on an upper end thereof. Several components are installed in the housing 500. The PCB 600 is embedded in the housing 500. The light source L is installed on a predetermined portion of the PCB 600. In this embodiment, an LED which serves as the light source L is installed on a rear end of the PCB 600. The LED which is used as the single light source applies light to the gear indication characters 120 using the light guide plate 300.

The light guide plate 300 is provided above the PCB 600. The light guide plate 300 is made of plastic. Light emitted from the light source L enters the light guide plate 300 and is diffused in a scattered reflection manner in the light guide plate 300. The light diffusion ink patterns 310 are printed on one surface of the light guide plate 300. Each light diffusion ink pattern 310 has a dotted shape so that the scattered reflection is promoted by light reflection between the dots. Thereby, light of the light source L can continue from the rear end to the front end of the light guide plate 300. Furthermore, a light diffusion sheet 320 is coupled to a lower surface of the light guide plate 300. The light diffusion sheet 320 may be painted with white to reflect light such that it can be diffused towards the front end of the light guide plate 300.

Therefore, light emitted from the LED which is provided on the rear end of the transmission position indicator can be easily diffused in the manner of being scattered and reflected towards the front end thereof by the light guide plate 300, the light diffusion ink patterns 310 and the light diffusion sheet 320.

The cover 100 covers an upper surface of the light guide plate 300. The cover 100 is made of opaque material. The gear indication characters 120 are formed transparently by coupling a separate transparent panel to the cover 100 or laser-printing. Light is transmitted from the light guide plate 300 to the outside through the gear indication characters 120 of the cover 100 so that a user can easily discern the characters at night.

Selected-gear indication marks are provided to indicate the current position of the transmission of the vehicle. FIG. 3 illustrates the exemplary embodiment of the transmission position indicator having no selected-gear indication mark. FIG. 4 illustrates the exemplary embodiment of the transmission position indicator in which selected-gear indication marks 110 are provided along with the gear indication characters 120. In both embodiments of the present invention, all of the gear indication characters 120 are emitted by only a single light source.

Figure 6:
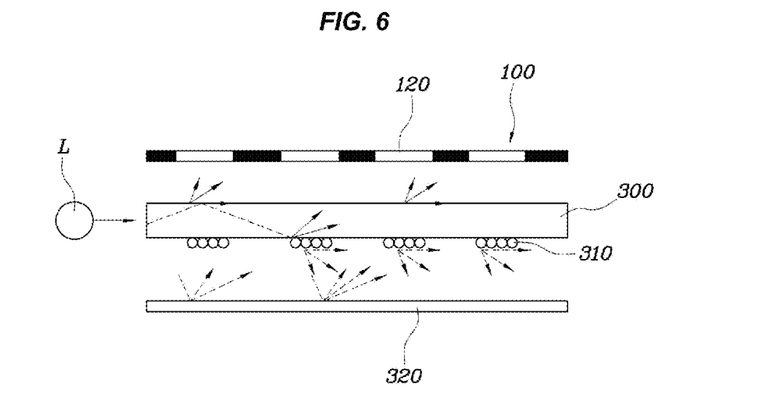
FIG. 6 is a view illustrating a light emitting principle of the transmission position indicator of FIG. 4.
Figure 7:
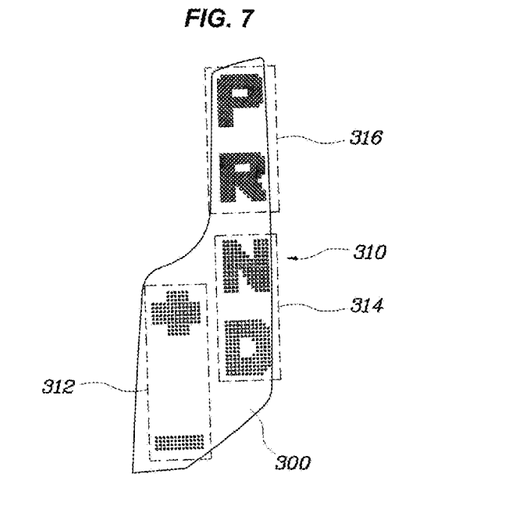
FIG. 7 is a perspective view of a light guide plate of the transmission position indicator of FIG. 4.

FIG. 6 is a view illustrating the light emitting principle of the transmission position indicator of FIG. 4. FIG. 7 is a perspective view of the light guide plate 300 of the transmission position indicator of FIG. 4.

In detail, it is desirable that the light source L emit light into one end of the light guide plate 300 in the longitudinal direction of the light guide plate 300. When light is emitted from the light source L into the one end, that is, the rear end, of the light guide plate 300, the light can be smoothly reflected in the light guide plate 300 and thus diffused towards the front end of the light guide plate 300. In particular, the light can be effectively reflected by the light diffusion ink patterns 310 and the light diffusion sheet 320.

The light diffusion ink patterns 310 are printed on the lower surface of the light guide plate 300. The light diffusion sheet 320 is coupled to the light guide plate 300 below the light diffusion ink patterns 310. Hence, light of the light source L is repeatedly reflected by the light guide plate 300 between the upper and lower surfaces thereof and proceeds towards the front end of the light guide plate 300. Here, the light is reflected and scattered by the light diffusion ink patterns 310. Light which goes downwards after undergoing the scattering and reflecting is reflected again upwards by the light diffusion sheet 320. Thereby, the maximum quantity of light can be irradiated onto the cover 100. As such, light emitted from the light source L can be very efficiently used.

Meanwhile, the light diffusion ink pattern 310 are printed on the light guide plate 300 at positions that correspond to the respective gear indication characters 120 and are spaced apart from each other by predetermined distances. In other words, the light diffusion ink patterns 310 are printed in the dotted shape only on portions of the light guide plate 300 where this is necessary, in this embodiment, at positions just below the respective gear indication characters 120, rather than being printed over the entire area of the light guide plate 300. Thereby, unnecessary reflection can be prevented. Furthermore, a sufficient quantity of light can be transmitted even to a portion which is comparatively distant from the light source L. If the light diffusion ink patterns 310 are printed over the entire area of the light guide plate 300, light is excessively reflected on the portion adjacent to the light source L, thus resulting in an insufficient quantity of light being transmitted to the distant portion.

Moreover, each light diffusion ink pattern 310 may have a dotted shape corresponding to that of the corresponding gear indication character. This case is more effective than the case where only the dotted patterns are printed at positions corresponding to the gear indication characters 120. In other words, as shown in FIG. 6, because the light diffusion ink patterns 310 are printed in shapes corresponding to the respective gear indication characters 120, reflection on unexpected portions is prevented, so that the perimeters of the characters 120 can be brighter. Therefore, the perimeters of the characters 120 can be clearly shown.

Meanwhile, the light diffusion ink patterns 310 are classified into several sections according to the distance by which they are spaced apart from the light source L. The light diffusion ink patterns 310 are configured such that as the distance between each section and the light source L increases, the brightness of the ink is increased. Furthermore, the light diffusion ink patterns 310 may be configured such that as the distance between each section and the light source L increases, the distance between ink dots is reduced.

In the exemplary embodiment of FIG. 7, the light diffusion ink patterns 310 printed on the light guide plate 300 are classified into several sections 312, 314 and 316 according to the distance that they have been spaced apart from the light source L by. Ink dots of the sections 312, 314 and 316 have differing brightness, and the distance between the ink dots and the patterns of the ink dots differ from each other. In this case, the quantity of light which is reflected by the ink dots disposed adjacent to the light source L is reduced so that a relatively low intensity of light is emitted therefrom. On the other hand, on the section 316 that is distant from the light source L, the brightness of the ink is comparatively high. In addition, because the distance between the ink dots is comparatively short, the frequency of light reflections increases. Therefore, the intensity of light emitted from the section 316 can be increased.

As such, the intensity of light emitted from the section 312 near the light source L is reduced and the intensity of light emitted from the section 316 distant from the light source L is increased, such that the light diffusion ink patterns 310 uniformly can use the light emitted from the light source L. Accordingly, the gear indication characters 120 can emit a uniform intensity of light regardless of the locations thereof.

Figure 8:
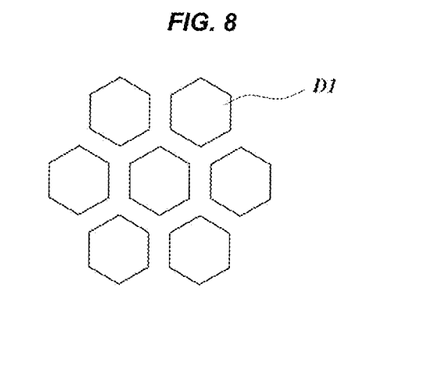
FIGS. 8 and 9 are views showing light diffusion ink patterns of the light guide plate of FIG. 7.
Figure 9:
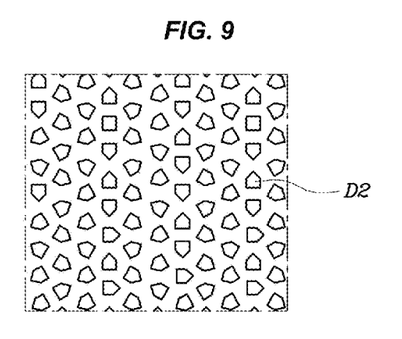

Each ink dot of the light diffusion ink patterns 310 has a polygonal shape. FIGS. 8 and 9 are views showing light diffusion ink patterns of the light guide plate 300 of FIG. 7. Referring to these drawings, the light guide plate 300 is sectioned into three sections according to the distance they are away from the light source L. In the exemplary embodiment, the light guide plate 300 is sectioned into a first section (+, −) 312, a second section (N, D) 314 and a third section (P and R) 316. The sections are configured such that the brightness and patterns of ink dots differ amongst the different sections. In detail, the first section 312 is nearest the light source L. In the first section 312, the ink pattern is configured such that the brightness of ink is comparatively low, each ink dot has a hexagonal shape, and the distance between the ink dots is the farthest, as shown in FIG. 8.

In the second and third sections 314 and 316, the ink patterns are configured such that the brightness of ink is increased, as the distance they are away from the light source L increases. Furthermore, as shown in FIG. 9, each ink dot has a pentagonal shape D2. As the distance they are spaced apart from the light source L increases, the distance between the ink dots is reduced. In addition, the polygonal ink dots are irregularly arranged rather than having a regular arrangement, so that scattered reflection can be effectively induced.

Figure 10:
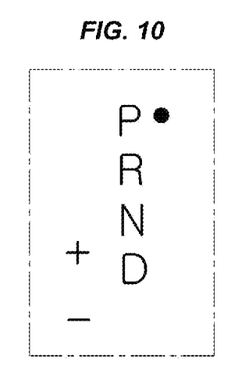
FIG. 10 is a view showing a light emitting state of the transmission position indicator of FIG. 4.

FIG. 10 is a view showing a light emitting state of the transmission position indicator of FIG. 4. Thanks to the light guide plate and the variation in brightness and pattern of the light diffusion ink patterns, the gear indication characters of the cover can emit a uniform intensity of light using only one light source regardless of the distance by which they are spaced apart from the light source. Furthermore, each gear indication character may be provided with a selected-gear indication mark. In this case, a separate indication means is used to enable the selected-gear indication mark to emit light. In conclusion, only one light source is used for the six gear indication characters (P, R, N, D, + and −), unlike the conventional technique that uses six light sources. Therefore, the design of the PCB is simplified, and the overall size of the entire transmission position indicator can be reduced. Also the product cost of the transmission position indicator can be markedly reduced.

As described above, the present invention provides a transmission position indicator which can reduce the number of light emitting units provided on a PCB, thus reducing the production cost, and reducing the size of the PCB, thereby overcoming the design restriction.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission position indicator for a vehicle, comprising:
    a housing;
    a PCB (printed circuit board) embedded in the housing, wherein a light source is provided at a predetermined position on the PCB;
    a light guide plate provided above the PCB and receiving light from the light source, wherein the light guide plate includes light-diffusion-ink patterns printed on a surface thereof, each of the light-diffusion-ink patterns having ink dots; and
    a cover coupled to an upper end of the housing, wherein the cover is made of opaque material and includes gear indication characters therein, the gear indication characters being made of transparent material, so that the light transmitted from the light guide plate is emitted outside the cover through the gear indication characters;
    wherein the light-diffusion-ink patterns are printed on the light guide plate at positions spaced apart from each other by predetermined distances corresponding to the respective gear indication characters; and
    wherein the light-diffusion-ink patterns have shapes corresponding to the respective gear indication characters.

2. The transmission position indicator as set forth in claim 1, wherein the light source emits the light onto a first end of the light guide plate in a longitudinal direction of the light guide plate.

3. The transmission position indicator as set forth in claim 1, wherein a light diffusion sheet is coupled to a lower surface of the light guide plate.

4. The transmission position indicator as set forth in claim 3, wherein the light diffusion sheet is spaced from the lower surface of the light guide plate with a predetermined gap.

5. The transmission position indicator as set forth in claim 3, wherein the light-diffusion-ink patterns are printed on the lower surface of the light guide plate, and the light diffusion sheet is coupled to the light guide plate below the light-diffusion-ink patterns.

6. The transmission position indicator as set forth in claim 1, wherein each of the ink dots of the light-diffusion-ink patterns has a polygonal shape.

7. The transmission position indicator as set forth in claim 1, wherein the light-diffusion-ink patterns are classified into a plurality of sections according to a distance that the patterns are spaced apart from the light source, wherein the sections are arranged such that as the distance that the patterns are spaced apart from the light source increases, brightness of the ink dots is increased.

8. The transmission position indicator as set forth in claim 1, wherein the light-diffusion-ink patterns are classified into a plurality of sections according to a distance that the patterns are spaced apart from the light source, wherein the sections are arranged such that as the distance that the patterns are spaced apart from the light source increases, a distance between the ink dots is reduced.

9. The transmission position indicator as set forth in claim 8, wherein each of the ink dots in the section disposed adjacent to the light source has a hexagonal shape.

10. The transmission position indicator as set forth in claim 8, wherein each of the ink dots in the section disposed away from the light source has a pentagonal shape.

* * * * *